UNITED STATES PATENT OFFICE.

REINHOLD LANSTROM, OF CINCINNATI, OHIO, ASSIGNOR TO JOHN G. ISHAM AND REUBEN F. HUGHES, OF SAME PLACE.

IMPROVEMENT IN ARTIFICIAL SLATE-PENCILS.

Specification forming part of Letters Patent No. 203,549, dated May 14, 1878; application filed April 8, 1878.

*To all whom it may concern:*

Be it known that I, REINHOLD LANSTROM, of Cincinnati, in the county of Hamilton and State of Ohio, have invented certain new and useful Improvements in Slate-Pencils; and I do hereby declare that the following is a full, clear, and exact description thereof, which will enable others skilled in the art to which it appertains to make and use the same, reference being had to this specification.

This invention relates to a new and improved composition slate-pencil and mode of making the same, as follows:

The composition of which the pencils are to be made is formed by making a preparation of six (6) parts blue calcareous clay or soft limestone, four (4) parts slate, two (2) parts soap-stone, two (2) parts carbonate of lime, and three (3) parts kaolin, powdered, mixed, and dampened with silicate of soda and potash, dried and heated till it becomes hard, and then reduced to a fine powder. To six (6) parts of the above preparation are now added two (2) parts of blue calcareous clay, or same proportion of slate, four (4) parts soap-stone, two (2) parts carbonate of lime, and three (3) parts kaolin are finely pulverized, moistening it, with a mixture of seven-eighths (⅞) part of silicate of soda and one-eighth (⅛) part silicate of potash, to the consistency of a stiff mortar.

The mass, after being thoroughly mixed, is then placed in a cylinder under heavy pressure, forming it into a solid body of suitable size and shape to again be placed into a receptacle, where it, under pressure, is reduced either by molding or drawing to the shape of the pencils required, which may be of any approved size. The pencils are now placed on corrugated metallic plates, so constructed as to allow a free passage of air over the pencil's when the plates are placed upon each other, and also to keep the pencils from bending during the drying process. The pencils are then placed in a drying-house, and exposed to a hot-air blast, and then tempered in a heater constructed for that purpose till they become sufficiently hard and complete.

In place of the first-named preparation, or incorporated in the same, I sometimes use scraps and broken pencils accumulated in the manufacture, heating and reducing the same to a fine powder, and again mixed with the above-named ingredients of clay or slate, soap-stone, carbonate of lime, kaolin, and silicate of soda and potash, in the proportions above mentioned, and producing the same result.

This composition makes a remarkably fine grade of pencil for slates, combining the softness of soap-stone and ease in writing with the soap-stone with the required toughness or hardness of the slate, making their use desirable and preferable in schools, &c.

Having thus described my improved pencil, and the manner of making the same, what I claim as new and useful, and desire to secure by Letters Patent, is—

As a new article of manufacture, a slate-pencil composed of the following ingredients: blue calcareous clay or its equivalent, slate, soap-stone, carbonate of lime, kaolin, silicates of soda and potash, in or about the proportions specified.

In testimony that I claim the foregoing as my own I hereby affix my signature in presence of two witnesses.

REINHOLD LANSTROM.

Witnesses:
R. F. HUGHES,
F. J. PAUL.